May 17, 1966 HANNS-DIETER PASCHKE 3,251,541
SEALING CONSTRUCTION FOR ROTARY MECHANISMS
Filed Dec. 14, 1964 5 Sheets-Sheet 5

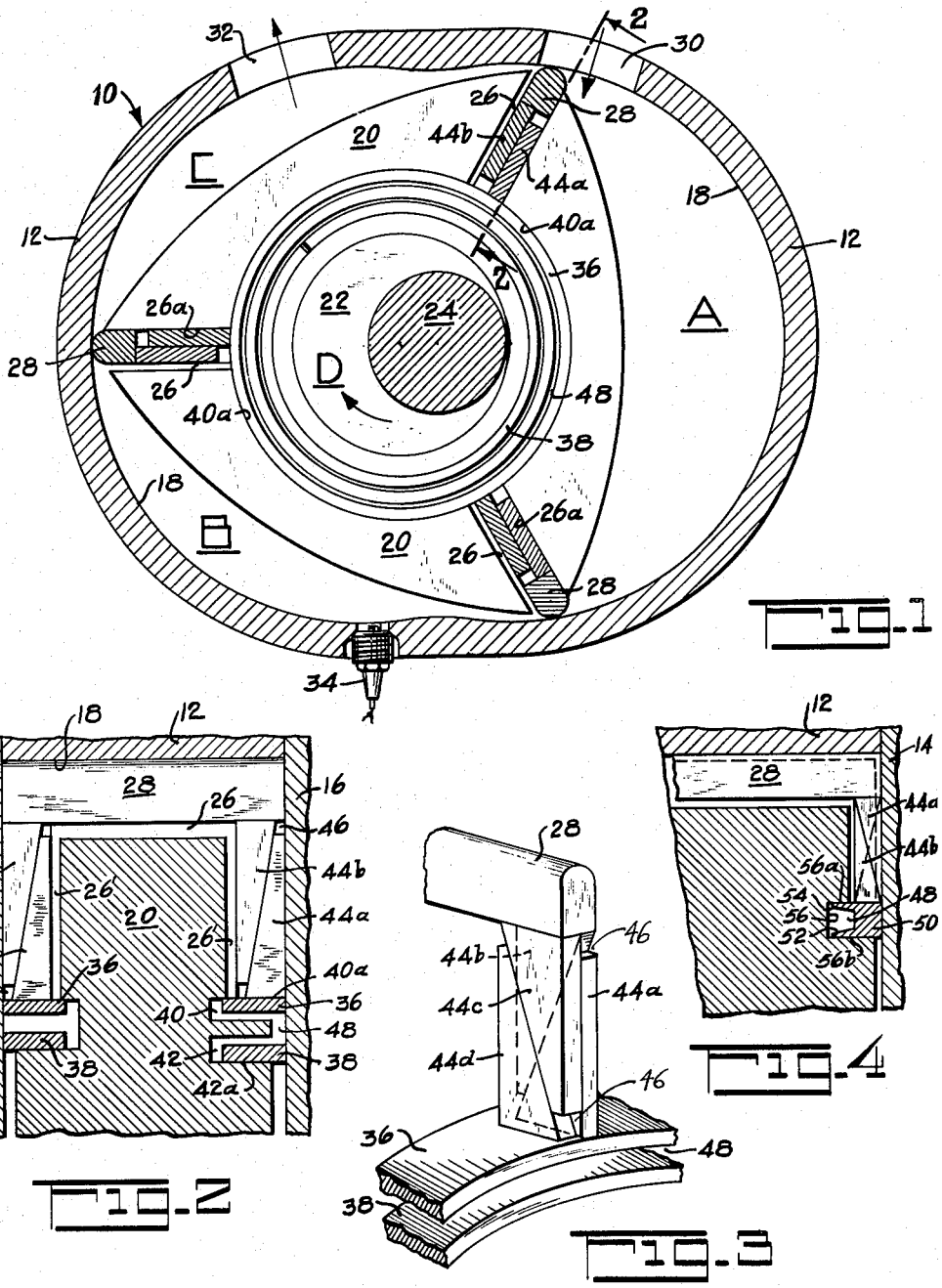

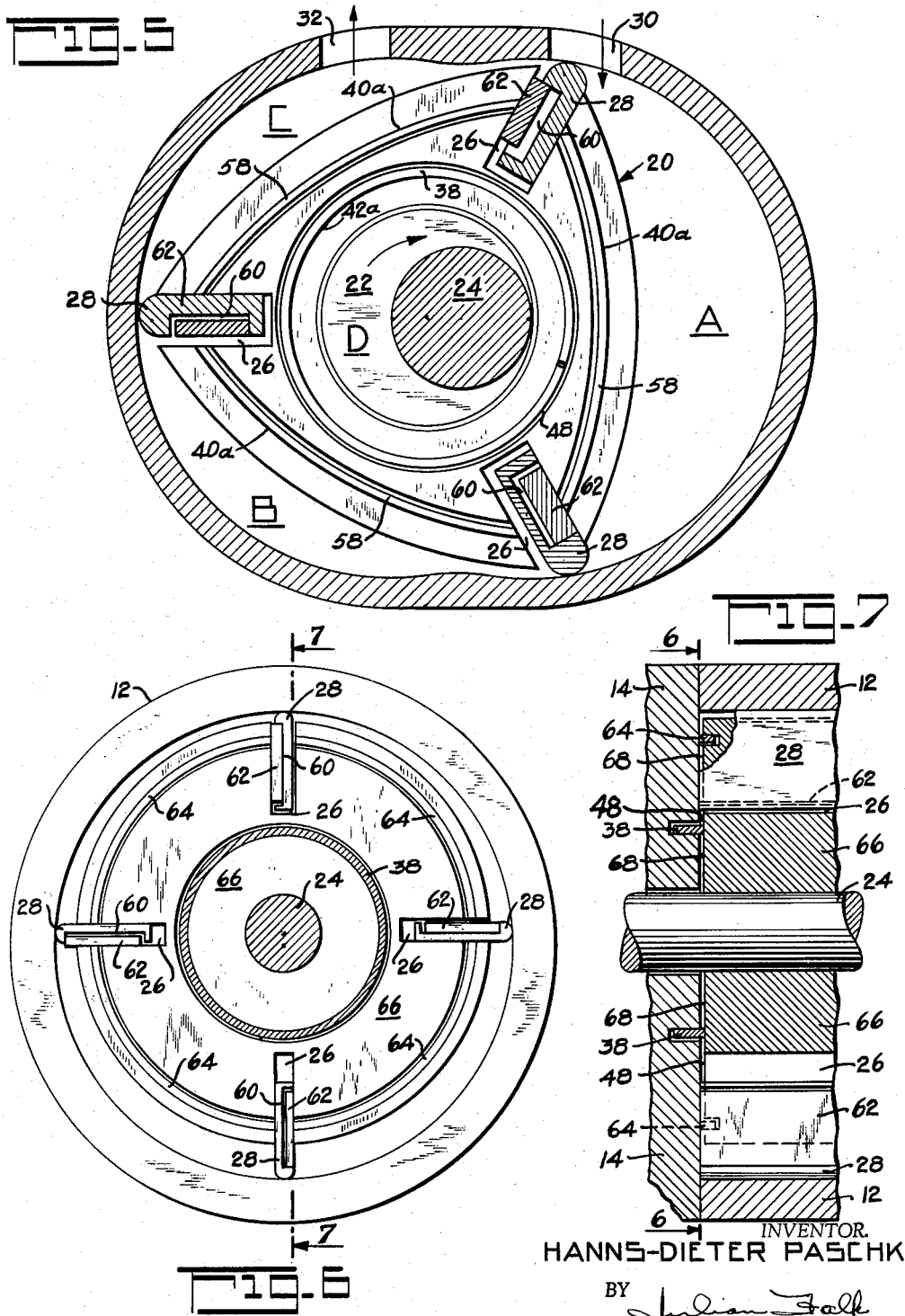

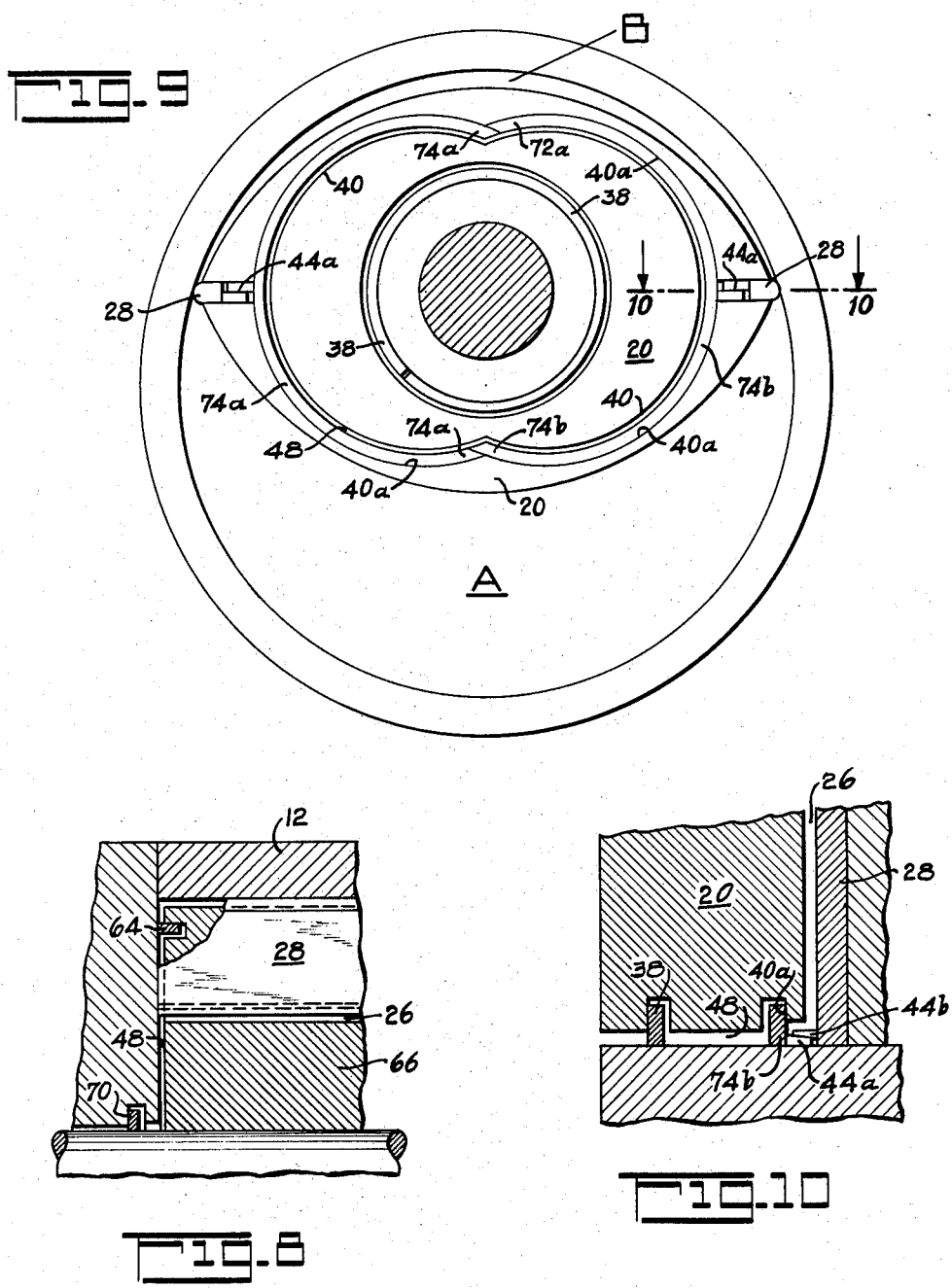

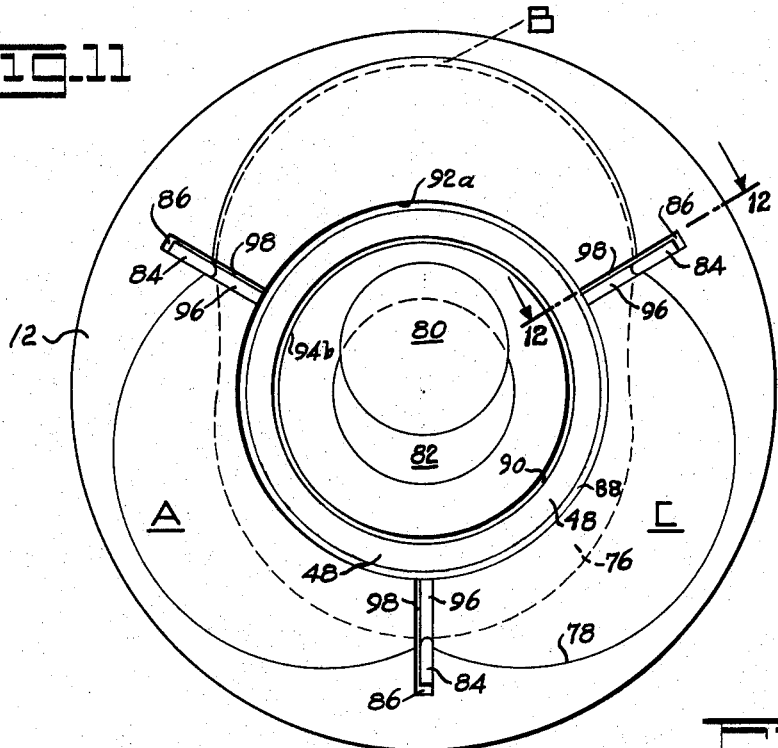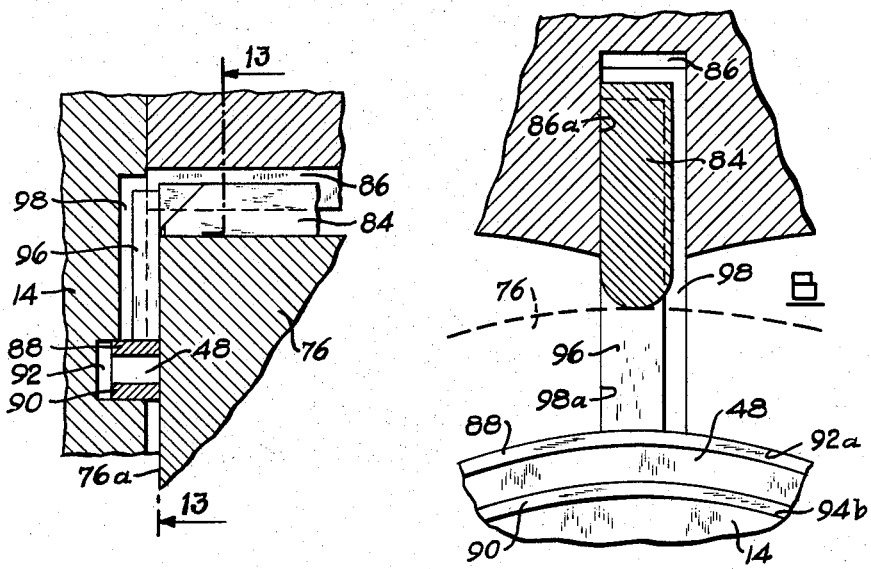

INVENTOR.
HANNS-DIETER PASCHKE
BY Julian Falk
ATTORNEY

United States Patent Office 3,251,541
Patented May 17, 1966

3,251,541
SEALING CONSTRUCTION FOR ROTARY
MECHANISMS
Hanns-Dieter Paschke, Weg, Neckarsulm, Germany, assignor to NSU Motorenwerke Aktiengesellschaft, Neckarsulm, and Wankel G.m.b.H., Lindau (Bodensee), Germany
Filed Dec. 14, 1964, Ser. No. 418,247
Claims priority, application Germany, Dec. 20, 1963, N 24,186
10 Claims. (Cl. 230—145)

This invention relates to rotary mechanisms and is particularly directed to a novel and improved sealing construction for said mechanisms.

Rotary mechanisms of the type to which the present invention may be applied generally comprise an inner body and an outer body, said bodies being relatively rotatable and defining therebetween a plurality of variable volume working chambers. Sealing means are normally provided between adjacent working chambers to prevent leakage of the working fluid from one working chamber having a relatively high pressure into the adjacent chamber which may have a relatively low pressure. In order to prevent leakage between the adjacent working chambers the sealing elements normally must be made with close tolerances which, as will be apparent, is difficult to do because of the relatively small size of the sealing parts thus also resulting in a high cost of manufacture.

The invention has for its prime purpose the provision of a sealing system for the working chambers in a rotary mechanism wherein the individual sealing elements need not be made with extremely close tolerances. In general, the sealing construction of the invention comprises a plurality of individual sealing elements disposed within grooves which carry said sealing elements, and with the sealing elements so arranged so as to provide a closed pressure chamber between at least some of said elements which chamber is in communication with the high pressure in a high pressure working chamber. The high pressure is used to press the sealing elements, which divide or seal a respective working chamber, against the seal groove walls adjacent to the neighboring low pressure working chamber which thereby provides a tight fitting sealing structure for the high pressure working chamber without the necessity of providing a high tolerance level for the sealing elements.

The sealing construction of the invention is particularly suitable for rotary piston engines which have an outer element or outer body and an inner body supported for relative rotation with the outer body. Radially movable seal elements and axially movable seal elements are disposed in grooves in the inner body which seal elements meet or intersect to provide sealing for the working chambers. The sealing elements slide along the peripheral surface of the outer body and the side walls thereof so that successive working chambers are formed in which the pressure varies during rotation. Rotary mechanisms of this type can also be used as compressors, pumps, expansion engines, and the like.

In accordance with the present invention, the cooperation of the axially movable seal elements and the radially movable seal elements, as will be described hereinafter, form an enclosed pressure chamber in each side wall of one of the bodies which pressure chamber is in communication with the particular working chamber wherein the highest pressure prevails. By this means the seal elements will be pressed against their groove walls in a direction away from the high pressure chamber or towards a low pressure chamber so that leakage of high pressure gas out of the high pressure working chamber into an adjacent working chamber cannot occur.

Accordingly, it is one object of the invention to provide a novel and improved seal construction for a rotary mechanism.

It is another object of the invention to provide a novel and improved seal construction for a rotary mechanism wherein the individual sealing elements can be manufactured without the necessity of providing high tolerance levels.

It is still another object of the invention to provide a novel and improved seal construction for a rotary mechanism wherein a plurality of sealing elements are provided which are effective to prevent leakage between the variable pressure working chambers of said rotary mechanism.

Other objects and advantages will be best understood when reading the following detailed description with the accompanying drawings in which:

FIG. 1 is a cross-sectional view taken through a trochoidal-type rotary piston engine and showing the sealing elements in the inner body of said rotary piston engine;

FIG. 2 is a sectional view taken along line 2—2 of FIG. 1;

FIG. 3 is a perspective view of a portion of the sealing elements of FIGS. 1 and 2;

FIG. 4 is a sectional view similar to that of FIG. 2 but showing a modification of the invention;

FIG. 5 is a sectional view similar to FIG. 1 but showing another modification of the invention;

FIG. 6 is a cross-section through another type rotary piston engine and embodying the invention;

FIG. 7 is a sectional view taken along line 7—7 of FIG. 6;

FIG. 8 is a partial sectional view similar to that shown in FIG. 7 but showing another modification of the invention;

FIG. 9 is a sectional view of a rotary piston engine having a two-lobed rotor or inner body and showing the invention;

FIG. 10 is a sectional view taken along line 10—10 of FIG. 9;

FIG. 11 is a cross-sectional view through a trochoidal-type rotary piston engine with the sealing elements being carried in the outer body thereof;

FIG. 12 is a sectional view taken along line 12—12 of FIG. 11;

FIG. 13 is a sectional view taken along line 13—13 of FIG. 12;

Figure 15:
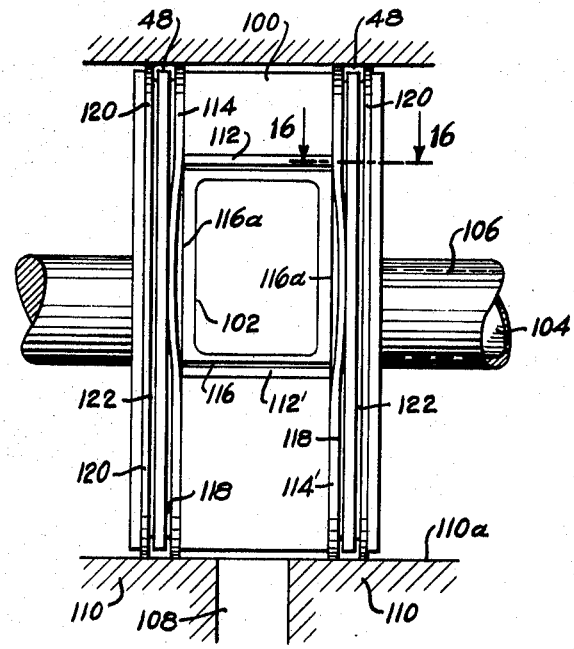
FIG. 15 is a view of a rotary slide valve embodying the invention.

Referring firstly to FIGS. 1–3, there is shown therein a rotary piston engine composed of an outer body 10 which includes a peripheral wall 12 and a pair of end walls 14 and 16 interconnected with said peripheral wall 12 to form a cavity. The profile of the inner surface 18 of the peripheral wall 12 is preferably basically a two-lobed epitrochoid. A three-lobed rotor or inner body 20 is rotatably supported on the eccentric portion 22 of the shaft 24 with said shaft being mounted co-axially with the cavity formed by the outer body. Seal grooves 26 are provided in each apex portion or corner of the rotor 20 with said seal grooves 26 carrying apex seals 28 for sealing engagement with the inner surface 18 of the outer body peripheral wall 12. Preferably, as illustrated in FIG. 1, the rotor has three apex portions and the multi-lobed cavity of the outer body has two-lobed portions although other combinations are possible. During relative rotation of the rotor 20 with the outer body 10 a plurality of working chambers A, B, and C are formed between the apex portions which working chambers vary in volume during rotation. An intake port 30 is provided for admitting air and/or a fuel-air mixture, an exhaust port 32 is provided for expelling the burnt gases from the engine and an ignition means comprising a spark plug 34 is provided for igniting the fuel-air mixture so that the stages of intake, compression, expansion and exhaust may be carried out.

In order to provide sealing for the working chambers of the rotor 20 between the inner faces of the end walls 14 and 16 and said rotor 20, two axially movable seal rings 36 and 38 are disposed in grooves 40 and 42 in a side face of the rotor 20 with said grooves 40 and 42 being in communication with one another. Intermediate seal bodies 44a, 44b, 44c and 44d are disposed in the seal grooves 26' and communicate or connect the radially movable seal strip members 28 with the radially outer seal ring member 36. The intermediate seal elements 44a–44d are disposed in the grooves 26' so that they extend into the annular groove 40 and are provided with angular mating surfaces so that the intermediate seal elements may move radially relative to one another for the purpose of permitting a change in length during radial movement of the seal member 28. As will be seen from FIGS. 2 and 3, when the intermediate seal elements 44a–44d move relative to one another, gaps 46 are left at their radial limits and in order to prevent leakage through the gaps 46 two pairs of wedge-shaped intermediate sealing elements are placed in mirror-image fashion or inverse symmetry in their associated seal groove. So, for example, it will be seen in FIG. 3 that when the intermediate seal body 44c is elevated to leave a gap at its radially inner dimension the seal element 44a will block any flow of gases through the gap 46 left by the movement of the seal element 44c.

Referring to FIG. 2, in particular the left hand side of FIG. 2, it will be seen that it is possible to place the rings 36 and 38 in a single common groove instead of two grooves such as 40 and 42. As will be apparent hereinafter, the operation is the same in both cases. As can be further seen, the outer axially movable seal ring 36 is made with sufficient axial dimension or width to cover the bottom of the groove 26'.

The seal construction of the invention including elements 28, 36, 38, and 44a–44d operates in the following manner: Assuming the greatest pressure to prevail in the working chamber B, because of the expansion cycle occurring there, while the pressure in working chambers A and C is substantially atmospheric, the pressure in working chamber B will force the radially movable seal strips 28 against the groove walls 26a or in a direction away from the high pressure towards the low pressure chambers A and C. High pressure from working chamber B may enter the seal grooves 26 from underneath the radially movable seal strip 28 which pressure will also press the seal strips 28 into sealing engagement with the inner surface 18 of the peripheral wall 12. In addition, the high pressure will force the intermediate sealing elements 44a–44d in an axial direction for sealing engagement with the inner faces of the end walls 14 and 16. The high gas pressure in working chamber B will also act through the groove 26' on the outer seal ring 36 to push it slightly away from its radially outer groove wall 40a and because of this the high pressure may get into the groove 40 as well as the groove 42. Thus the grooves 40 and 42 form with the seal rings 36 and 38 a pressure chamber designated at 48 which is self-contained and continuous around the rotor over the entire circumference thereof. The pressure in this chamber 48 will act against the radially inner seal ring 38 to push it against its radially inner groove wall 42a and axially outwardly against the inner faces of the end walls 14 and 16, respectively, while the radially outer seal ring 36, in the region of the working chambers A and C is pressed radially outwardly against its outer groove wall 40a since the pressure in these working chambers is less than the pressure in the pressure chamber 48. In addition, the seal ring 36 will also be forced axially outward into sealing engagement with the inner faces of the end walls 14 and 16.

As can be seen in FIG. 2, the radially outer seal ring 36 covers the bottom of the groove 26' which groove 26' contains the intermediate sealing elements 44a–44d. In this manner there is obtained a substantially perfect sealing of the working chambers A, B, and C relative to one another and in the radially inward direction between the radially inner portion of the rotor so that it may be said that the seal construction of the invention including the elements 28, 44a–44d, 36 and 38 provide sealing between the working chambers in the circumferential direction and a radial direction between the outer body peripheral wall 12 and end walls 14 and 16 and the eccentric 22. When the rotor 20 rotates in the direction of arrow D the working chamber B will eventually come into contact with the exhaust port 32 while working chamber A will move into the compression cycle formerly occupied by working chamber B, as illustrated in FIG. 1. At this time, the highest pressure will prevail in working chamber A and when this pressure exceeds pressure in the pressure chamber 48 the outer seal ring 36 will be lifted from its radially outer groove wall 40a so that the high pressure from working chamber A will now be able to enter in the pressure chamber 48 as was the case previously when working chamber B occupied this position. In this manner, in each position of the rotor and for all pressure relationships between the individual working chambers A, B, and C perfect sealing between said working chambers will be obtained.

Referring to FIG. 4, there is shown therein a construction the same as that shown in FIGS. 1–3 but instead of providing two seal rings 36 and 38, a single seal ring 50 is provided which has two elastic lips 52 and 54. The single seal ring 50 is disposed in a groove 56 and in response to pressure from the working chamber having the highest pressure therein, the radially outer sealing lip 54 in the region of said working chamber will be pushed away from the radially outer groove wall 56a so that the high pressure gas is able to get into the pressure chamber 48. The pressure in the pressure chamber 48 will then push the seal ring 50 axially into sealing engagement with the adjacent inner face of the end wall 14 or 16 and press the radially inner seal lip 52 of the seal ring 50 radially into sealing engagement with the radially inner groove wall 56b. In addition, in the region of the other working chambers having a relatively lower pressure therein, the radially outer lip of the seal ring 50 will be pushed into sealing engagement with the radially outer groove wall 56a. It will be seen therefore that the operation of the embodiment of FIG. 4 is substantially the same as that of FIGS. 1–3.

In FIG. 5 there is shown an engine having substantially the same trochoidal design as that of FIGS. 1–3. However, in FIG. 5 the rotor 20 is provided with a slightly different seal system than that shown in the engine of FIG. 1. In the construction of FIG. 5, instead of the outer axially movable seal ring being made as one continuous ring member, or one slit similarly to a piston ring for internal-combustion cycles, or in the form of a continuous sealing lip, in this embodiment the outer axially movable sealing member is formed in strip-like annular sections 58 which extend between adjacent radially movable seal elements 28. The annular strip-like sections 58 provide sealing between the rotor 20 and the inner faces of the end walls of the engine. One side of each of the radially movable seal members 28 is provided with a cutout portion 60 which extends the entire length of the seal strip member 28 and a loosely mounted insert member or sealing element 62 is provided in said cutout 60 as illustrated in said FIG. 5. The insert member 62 bears against an adjacent end of a seal strip 58 and the radially movable seal member 28 bears against the adjacent end of the opposite seal strip 58 terminating at a seal groove 26. The cutout portion 60 and the insert member 62 are designed so that high pressure gas out of the high pressure chamber 48 can get into the cutout portion 60 behind the insert member 62. The operation is as follows: Assuming the pressure to be highest in the working chamber B, this high pressure will lift the seal strips 58 adjacent chamber B away from its radially outer groove wall 40a and the high pressure will be permitted to enter the pressure chamber 48. In addition, high pressure gas can also get into the pressure chamber 48 through the grooves 26 containing the radially movable seal elements 28 which circumferentially define the working chamber B. High pressure may also get into the seal grooves 26 which pressure will press the insert member 62 against the corresponding end of the seal strips 58. The seal strips 58 which are adjacent the lower pressure chambers A, C will be forced by the high pressure from pressure chamber 48 against their radially outer groove walls 40a and also in an axial direction into sealing engagement with an adjacent inner face of an end wall. The radially inner annular seal ring 38 will be pressed against its radially inter-groove wall 42 due to the fact that the high pressure in the pressure chamber 48 will act thereon in a similar manner as described in relation to the radially inner sealing 38 of FIG. 1. Spring means may also be provided in the grooves 60 to maintain the insert members in a position biased away from the radially movable seal member 28 so as not to permit the insert member to plug up the cutout portion 60. It will be seen therefore that in the embodiment of FIG. 5 as well as in the embodiments previously described effective sealing will be provided through the pressure chamber 48 communicating the pressure from a high pressure working chamber with the seal elements to bias them against associated groove walls so that leakage would be prevented between the high pressure chamber and the low pressure chambers.

FIGS. 6 and 7 show the use of the sealing construction of FIG. 5 but with a rotary piston engine of the piston slide type. For the sake of simplicity, some of the reference characters have been changed from FIG. 5 in order to differentiate the two mechanisms. The engine of FIGS. 6 and 7 comprises an outer body or housing 12, end walls 14 and 16 and a rotor 66 disposed within the outer body with said rotor 66 being supported on a shaft 24. The rotor 66 is provided with radial grooves 26 in which are provided radially movable piston slides or seals 28. As can be seen in FIG. 7, the radially outer axially movable seal 64 which consists of annular seal sections, and the insert members 62 as well as their associated radial movable seal member 28 are disposed in the rotor 66 while the radially inner axially movable seal member 38 is on the other hand disposed within a groove in the end wall 14. The inner seal member 38 slides along or seals against an adjacent side face 68 of the rotor 66. Again, as explained above, a pressure chamber 48 is provided which is formed by seal elements 64, 62, 28 and 38. The manner of operation of the embodiments of FIGS. 6 and 7 is the same as that of FIG. 5 and reference may be made to the description above.

Whereas in the previously described examples of the sealing construction of the invention, the radially inner seal member which defines the radially innermost portion of the sealed working chambers, was an axially movable seal member, in FIG. 8 there is shown a seal member 70 which is radially movable. The seal member 70 is contained in a groove in an outer body end wall and surrounds and seals against the engine shaft which carries the rotor 66. This construction is particularly useful with engines having a non-rotatable shaft around which the rotor turns but which does not rotate about its own axis, as for example, the engine shown in FIG. 6 wherein the rotor rotates about the fixed shaft 32 or in the case of rotary piston engines of the trochoidal type. It will be seen that in the embotiment of FIG. 8 a pressure chamber 48 is formed between the radially outer axially movable seal member 64 and the radially inner, radially movable seal member 70, which pressure chamber 48 functions in the same manner as a pressure chamber previously described to insure that no leakage of gases will occur between the high and low pressure chambers.

Another form of the sealing construction of the invention is illustrated in FIGS. 9 and 10 wherein the sealing elements are likewise disposed in the inner body or rotor in a rotary piston engine. In comparison with the previously described constructions, for example, FIGS. 1–3, the difference herein consists in that the radially outer axially movable seal members consist of two annular sections 74a, 74b whose ends overlap one another and through pressure are caused to bear tightly against one another. A seal member or construction of this type is described in German Patent 919,569 issued to Froede and entitled "Dichtgrenze aus Kreisförmigen Elemeten" (one sht., drwg., 2 pp. spec.). The manner of operation of the embodiment of FIGS. 9 and 10 is as follows: Assuming again the highest pressure to prevail in the working chamber B, the annular sections 74a and 74b will be lifted slightly from their radially outer groove wall 40a so that a gap is produced between the overlapped ends of the annular seal sections 74a, 74b through which the high pressure gas can escape into the pressure chamber 48. This high pressure gas will press the annular sections 74a, 74b in the vicinity of the working chamber A, wherein there is a relatively low pressure, against their groove wall 40a and will also press the ends of the seal sections 74a, 74b into sealing abutment. The radially movable seal elements 28 are, as in the example of the construction of FIG. 1, in communication with intermediate seal elements 44a–44d and through said seal elements 44a–44d in communication with the outer peripheral surfaces of the annular sections 74a and 74b.

The sealing construction of the invention is also applicable to rotary piston engines wherein the sealing elements are carried by the outer body. Such a construction is shown in FIGS. 11–14 wherein there is shown a rotary piston engine wherein the outer contour of the rotor 76 has a shape of a two-lobed epitrochoid, while the inner surface 78 of the outer body peripheral wall corresponds to the outer envelope of this epitrochoid. A rotor 76 is disposed so as to be rotatable on the crankpin 80 of the shaft 82. The rotor is shown in dotted lines in order to more clearly illustrate the sealing elements which are in sliding contact with said motor. The sealing construction consists of radially movable seal elements 84 which are disposed in grooves 86 in the peripheral wall 12, two axially movable seal members 88 and 90 which are disposed so as to be axially movable in an annular groove 92 in each end wall 14 and 16 of the outer body, and intermediate seal elements 96 disposed between the outer axially movable seal element 88 and the individual radially movable seal elements 84. The intermediate sealing elements 96 are disposed in grooves 98 whose groove walls are aligned with the walls of the grooves 86 supporting the radially movable seal elements 84. The axially movable seal rings 88, 90 define between them a pressure chamber 48 which is in communication with the operative chamber A, B, or C in which the highest pressure prevails. Feferring to FIG. 11, it will be seen that the highest pressure prevails in working chamber B. The high pressure in said working chamber B will press the radially movable seal strips 84 against their groove wall 86a in a direction away from the high pressure chamber B and will also press them into sealing engagement with the outer peripheral surface of the rotor 76. In addition, the high pressure will press the associated connecting sealing elements 96 against their groove wall 98a, also in a direction away from the high pressure working chamber B and against the axial side faces of the rotor 76. The high pressure will lift the outer axially movable seal rings 88, in the vicinity of the working chamber B, slightly away from the radially outer groove wall 92a so that the high pressure gas can flow into the pressure chamber 48. The high pressure in the pressure chamber 48 will push the radially inner axially movable seal ring 90 against its radially inner groove wall 94b and will then force the radially outer seal ring member 88, in the vicinity of the working chambers A and C, against its radially outer groove wall 92a while at the same time effecting a pressure against the seal rings 88, 90 against the adjacent face 76a of the rotor 76. It should also be understood that the radially movable seal members 84 can be divided to make possible a change of length for variations in seal groove dimensions in variations in working chamber dimensions as for example, illustrated with regard to the seal elements 44a–44d. It will be apparent from this description that the embodiment of FIGS. 11–14 operates in the same manner as the figures or devices previously described.

Figure 16:
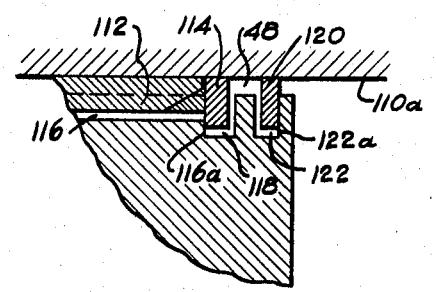
FIG. 16 is a sectional view taken along line 16—16 of FIG. 15.
Figure 14:
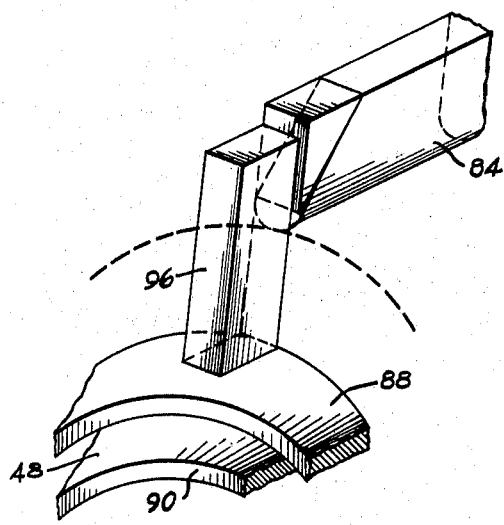
FIG. 14 is a perspective view of a portion of the sealing elements shown in FIGS. 12 and 13.

Whereas the foregoing description has been restricted exclusively to rotary piston machines or engines, there is illustrated in FIGS. 15 and 16 application of the seal construction of the invention to a rotary slide valve mechanism. Referring to said FIGS. 15 and 16, a rotary slide valve 100 is illustrated therein and comprises one or more ports 102 which communicate with a channel or passageway 104 in the slide valve mechanism shaft 106 and with a channel or passageway 108 in the cylindrical inner wall 110a of the surrounding outer body or housing 110 for the purpose of conveying an operative medium to or away from an accessory engine or operating machine. A port 102 is delimited by sealing elements 112, 112′ and 114, 114′, which are disposed in grooves 116 and 118 which are in communication with one another (FIG. 16). The sealing elements 114, 114′ are annular and extend over the entire periphery of the rotary slide valve 100. The seal elements 112, 112′ are strip-like, and abut against the seal elements 114, 114′. In order that the seal elements 112, 112′ can compensate for variations in the chambers which are to be sealed by said elements, the seal elements 112, 112′ can be made in more than one part which parts mate so that the seal elements can change in length without losing sealing contact. For example, as shown in FIG. 16, the seal element 112 has a diagonal portion cut at one of its ends so that the main portion may slide relative to said cut portion thereby executing a change in length of the seal element 112 without losing sealing contact. Each seal element 114 in combination with a seal ring member 120 serves to form between them a pressure chamber 48. The seal ring 120 is disposed in a groove 122 which also extends over the entire periphery of the rotary slide valve 100.

The pressure in the port 102 from the operating medium therein will enter the groove 116 and press a seal element 112 against the cylindrical inner wall 110a of the surrounding outer body or housing 110. Moreover, the pressure will lift the seal element 114 in the vicinity of the port 102 somewhat away from the groove walls 116a near this port, through which the high pressure gas can get into the pressure chamber 48. This pressure in the chamber 48 will be applied against the ring 120 so that the ring 120 will be pressed against its outer groove wall 122a and will also spread it into sealing contact against the cylindrical inner wall 110a of the outer body. In the vicinity beyond the port 102 the ring 114 will also be spread so that it will bear with sealing action over its entire periphery against the cylindrical wall 110a. In addition, the pressure in the pressure chamber 48 causes the rings 114, 114′, in the vicinity beyond the port 102, wherein there is a lower pressure, to press against the inner groove wall 116a. It will thus be seen that the embodiments of FIGS. 15 and 16 operate in the same manner as a sealing construction applied to the previously explained embodiments.

In each of the figures, the sealing elements and gaps are illustrated as substantially larger than their actual size for the purpose of more clearly illustrating the invention. The thickness of the seal strips for example usually amounts to only a few millimeters while the gaps are only a few tenths or hundredths of a millimeter wide.

It will be apparent from the above description that a novel and improved sealing construction is provided which makes use of the high pressure provided in one of the working chambers for forcing the individual sealing elements into sealing contact with associated rotary mechanism parts for respectively sealing the working chambers from one another and that due to the utilization of the high pressure in one of the working chambers the sealing elements need not be made with relatively close tolerances. This of course leads to greater reduction in costs in the manufacture of the sealing elements as well as ease of manufacturing.

While I have described my invention in its preferred form it will be obvious to one skilled in the art that various changes and modifications may be made without departing from the spirit and scope of the invention as defined in the following claims.

What is claimed is:

1. A sealing structure for a rotary mechanism having an outer body and an inner body rotatable relative to one another which bodies during relative rotation successively define a plurality of working chambers in which the pressure varies so that when the pressure in one of said working chambers is relatively high the pressure in another of said working chambers is relatively low, said sealing structure comprising, first seal means including a plurality of radially movable sealing members supported in groove means in one of said bodies for sealing each said working chamber at each circumferential end thereof, second seal means supported for axial movement in groove means in one of said bodies for sealing said working chambers between the axial inner faces of said outer body and the axial outer faces of said inner body, said second seal means being responsive to pressure from said working chamber having the highest pressure for permitting said high pressure to enter said groove means for said second seal means, third seal means supported in groove means in one of said bodies and disposed radially inwardly of said second seal means, said second and third seal means defining between them a continuous pressure chamber, said pressure chamber communicating with the working chamber having the relatively highest pressure and each of said groove means being in communication with said pressure chamber in the region of said working chamber having the highest pressure so that each seal means will be forced by the high pressure from said pressure chamber into sealing engagement with an associated sealing surface defining a low pressure working chamber for preventing leakage of a working fluid between said high and low pressure working chambers.

2. A sealing structure as recited in claim 1 wherein said second seal means and said third seal means comprise substantially coaxial ring members with said ring member of said second seal means being disposed for sealing contact with said first seal means.

3. A sealing structure as recited in claim 2 wherein the ring members of said second and third seal means are disposed in a common groove in one of said bodies.

4. A sealing structure as recited in claim 1 wherein said second and third seal means are disposed in a common groove in one of said bodies and comprise a single ring member having two spaced elastic sealing lips, one for sealing against one groove wall and the other for sealing against an opposite groove wall.

5. A sealing structure as recited in claim 1 wherein said first seal means includes a plurality of intermediate seal members disposed between and for sealing engagement with said radially movable sealing members and said second seal means.

6. A sealing structure as recited in claim 5 wherein said intermediate seal means includes two pairs of mating triangularly-shaped and relatively movable seal members with said seal members being arranged for permitting relative movement between said radially movable sealing members and said second seal means while maintaining effective sealing during said relative movement.

7. A sealing structure as recited in claim 1 wherein said second seal means comprises a plurality of annular section sealing strips disposed between and in sealing contact with said first seal means.

8. A sealing structure as recited in claim 7 wherein each said radially movable seal member of said first seal means has a cut-out portion in one side face thereof, a loosely supported insert member disposed in said cut-out portion for abutting engagement with one end of an annular section sealing strip of said second seal means, and said insert member arranged within said cut-out portion so that pressure from said pressure chamber can enter said cut-out portion behind said insert member for forcing said insert member into sealing engagement with said one end of said annular section seal strip.

9. A sealing structure as recited in claim 1 wherein said first and second seal means are supported by said inner body and said third seal means is supported by said outer body.

10. A sealing structure as recited in claim 1 wherein said second seal means comprises two annular seal member sections with the ends of each said section overlapping each other in sealing engagement in response to radially outwardly directed pressure, said seal member sections being further disposed in abutting relationship with said first seal means, and said third seal means comprising an annular seal member for sealing the radially inward portion of each of said working chambers.

References Cited by the Examiner

UNITED STATES PATENTS

| | | | |
|---|---|---|---|
| 723,656 | 3/1903 | Dunn | 123—8 |
| 1,796,535 | 3/1931 | Rolaff | 123—8 |
| 3,033,180 | 5/1962 | Bentele | 123—8 |
| 3,102,518 | 9/1963 | Anderson | 123—8 |
| 3,102,520 | 9/1963 | Schlor | 123—8 |

FOREIGN PATENTS

| | | |
|---|---|---|
| 1,277,873 | 10/1961 | France. |
| 699,930 | 12/1940 | Germany. |

MARK NEWMAN, *Primary Examiner.*

W. J. GOODLIN, *Assistant Examiner.*